Patented Apr. 28, 1942

2,281,445

UNITED STATES PATENT OFFICE 2,281,445

SOLVENT-RESISTANT ETHYL CELLULOSE FILM

Toivo A. Kauppi, Midland, Mich., assignor to The Dow Chemical Company, Midland, Mich., a corporation of Michigan No Drawing. Application February 8, 1940, Serial No. 317,969

5 Claims. (Cl. 260—15)

The present invention relates to ethyl cellulose compositions and to solvent-resistant films, filaments, tapes and like thin articles made therefrom.

Ethyl cellulose of from medium to high ethoxy type, i. e. that containing 43.5 per cent ethoxy or more, dissolves readily in a wide variety of solvents, including many alcohols, esters, aromatic hydrocarbons and mixtures thereof, to suggest but a few. At the same time ethyl cellulose films have greater inherent flexibility and toughness than have films of the cellulose esters, including nitrocellulose and the organic acid esters of cellulose. Hence, it may frequently be desirable to employ ethyl cellulose as a tough, flexible base material in various manufacturing operations, and in some of these instances its ready solubility in organic solvents may be its greatest weakness. Thus, where it is desired to coat ethyl cellulose films with solvent-deposited adhesives, for example, the solvent from which the adhesive is deposited has such a quick action on the ethyl cellulose base film that the latter curls or is distorted during subsequent handling of the article prior to evaporation of residual compounds. It is, therefore, desirable to prepare flexible thin articles which have the desirable properties of ethyl cellulose while, at the same time, having improved solvent resistance.

It is accordingly among the objects of the invention to provide a composition of matter capable of depositing films and like thin articles having the flexibility and toughness characteristic of ethyl cellulose while possessing as well an improved resistance to solvents. Another object is to provide such films or other thin articles of manufacture from the said composition.

According to the invention, the foregoing and related ends are attained through the preparation and employment of a new composition to be more fully defined hereinafter. The new composition consists (on the solids basis) essentially of from 90 to 65 per cent by weight of medium ethoxy ethyl cellulose and correspondingly from 10 to 35 per cent of a colorless organo-soluble, heat-convertible toluene sulphonamide-formaldehyde resin. If the composition contains less than 10 per cent of the said resin, it cannot be made sufficiently solvent resistant. If it contains substantially more than 35 per cent of the resin, its films are too brittle and take on more of the characteristics of the resin itself. These ingredients may be dissolved in the common solvent for the two solids and the new articles may be prepared by casting films or spinning filaments from the solution, and thereafter heating the dried article at a temperature between 50° and 140° C. for from 10 minutes to several days as required to harden the article and to make it more resistant to solvents. The new composition can be employed for coating purposes wherever the article to be coated may be subjected to the required heat treatment. An example of such use is as an internal coating for metal containers for gasoline.

The ethyl cellulose employed according to the invention is a uniformly ethylated product having an ethoxy content between 43.5 and 46.5 per cent. This type of product is commercially available under the designation "medium ethoxy ethyl cellulose." Such an ethyl cellulose is readily dissolved in a variety of volatile organic solvents and forms tougher, more abrasion-resistant films than does ethyl cellulose of higher degrees of substitution. The medium ethoxy ethyl cellulose employed in the present compositions comprises from 90 to 65 per cent of the solids present, the remainder being a particular type of toluene sulphonamide-formaldehyde resin.

The resin employed is a substantially colorless, heat-hardenable aryl sulphonamide-formaldehyde resin, such as the toluene sulphonamide-formaldehyde condensation product, xylene sulphonamide-formaldehyde resin, or analogs thereof, compatible with ethyl cellulose and soluble in all of the solvents commonly used for dissolving ethyl cellulose. Typical examples of commercially available resins conforming to the above requirements are Santolite M. S. and Santolite M. H. P. These resins and solutions are substantially colorless and yield substantially colorless compositions with ethyl cellulose whether in solution or deposited as a film.

Since the two basic ingredients of the composition are compatible with one another in all proportions and since they are soluble in a wide variety of common solvents, the compositions herein claimed are most simply prepared by dissolving the desired proportions of the materials in a mutual solvent. The solvent-resistant articles of the composition may be made by casting a film or spinning a filament from a solution of desired concentration and subjecting the so-formed shaped article to a baking operation which hardens the resin component of the composition, thereby increasing the solvent resistance of the article as compared with either that of the formed article prior to baking or a similar article of unmodified ethyl cellulose. As has been previously indicated, the baking operation may be carried out at temperatures between 50° and 140° C. for a time interval of from 10 minutes to several days as required. Quite commonly it has been found that suitable hardening of the article may be effected by baking for 30 minutes at 120° C. or 20 minutes at 130° C. Instead of the aforesaid short baking schedule, it is generally preferred when operating with the herein-defined compositions to bake for longer periods of time than those indicated and in the lower end of the suggested temperature range. It has been found that solvent-resistant films of extremely high flexibility may be produced when the baking operation is carried out at temperatures of from 50° to 80° C. for periods of from 16 to 64 hours. In practice, films deposited from the above described composition have been rolled up, placed in an oven, subjected to the baking treatment just suggested, and have been found to withstand this heat-treatment without wrinkling, sticking, or discoloration.

The following example is given purely by way of illustration of the invention:

Several films were cast from a clear solution of a composition consisting of 85 per cent of ethyl cellulose of 44 per cent ethoxy content and 15 per cent of a toluene sulphonamide-formaldehyde resin, known commercially as "Santolite M. H. P." The solvent was evaporated from the films. Various samples were heated at 120° C. for periods of from 1 to 2 hours. The so-hardened films had tensile strengths averaging about 445 kilograms per square centimeter of original cross section and were capable of from 5 to 8 per cent elongation. An unbaked film had a tensile strength of 415 kilograms and was capable of about 8 per cent elongation. The films were then soaked for one hour in "petrobenzol" (a mixture of petroleum hydrocarbons having an evaporation rate equivalent to that of benzene), after which they were removed from the solvent bath and tested. The baked samples had average tensile strengths of about 310 kilograms per square centimeter while the unbaked sample had a tensile strength of only 88 kilograms. The elongation values were in each case just slightly higher than those on the corresponding samples prior to immersion in the solvent bath. The baked samples showed no tendency to wrinkle or to curl during or following their immersion in the solvent, while the unbaked sample wrinkled badly while wet with solvent and was somewhat distorted after drying.

In similar manner, films cast from a solution of a composition consisting of 80 per cent of ethyl cellulose and 20 per cent of the toluene sulphonamide-formaldehyde resin were baked for 24 hours at a temperature of 65° to 70° C. These were immersed in the solvent bath above described and tested for tensile and elongation values in comparison with unbaked films of the same composition. The baked article prior to immersion had a tensile strength of 740 kilograms per square centimeter as compared with 635 kilograms for the unbaked film. Each of the films exhibited an elongation of about 32 per cent. After immersion for one hour in the hydrocarbon solvent mixture, the baked film had a tensile strength of about 320 kilograms, whereas the unbaked film had a tensile strength of about 200 kilograms. Again it was found that the article which had been heat treated exhibited no wrinkling or distortion during or subsequent to the solvent treatment, whereas the unbaked forms wrinkled badly when wet with solvent and was somewhat distorted after evaporation of the solvent.

By way of comparison, a number of compositions were made up containing the same toluene sulphonamide-formaldehyde resins and a standard ethoxy ethyl cellulose, i. e. one containing about 49 per cent ethoxy. It was found that whether or not these samples were subjected to a heat treatment they were adversely affected by immersion in the hydrocarbon mixture above described. Prior to immersion, they had tensile values ranging from about 160 to 360 kilograms per square centimeter and after immersion in the solvent the dried films had tensile values of only 20 to 30 kilograms per square centimeter. It is apparent that standard ethoxy or high ethoxy ethyl cellulose is unsuited to the production of solvent-resistant films of the type with which the present invention is concerned. It is also apparent that even when employing medium ethoxy ethyl cellulose a solvent-resistant article which retains enough strength to be useful in commercial fabrication of shaped articles after contact with solvent is not produced unless the article has been subjected to a heat treatment of sufficient intensity and duration to harden the resinous component of the film.

Films cast from solutions of the present composition and heated as above described to convert the ethyl cellulose to a solvent-resistant form are useful for a greater variety of purposes than are films of unmodified ethyl cellulose or films of plasticized ethyl cellulose. Among the particular uses to which the herein-claimed films may be put and for which the customary ethyl celluloses are not entirely satisfactory may be mentioned the preparation of articles which involve the depostioin from solution of adhesives on the film surface.

Transparent pressure-sensitive adhesive tape is commonly prepared by applying to strips of transparent film a naphtha solution of a composition comprising rubber or a rubber derivative to provide adhesion and a tacky resin such as rosin to provide the necessary tackiness. The film base should be dimensionally stable when in contact with the solvent from which the adhesive is deposited. It is preferable also that the solution of adhesive have at least a surface-softening effect on the film base so as to unite the adhesive with the base at their common interface. While regenerated cellulose and cellulose acetate films meet the requirement of dimensional stability toward the adhesive solvent, they are not in the least softened by the adhesive vehicle, and in practice the adhesive is only superficially applied to the surface of such films rather than being integrally bonded thereto. Further, regenerated cellulose is not sufficiently moisture-resistant and water-repellent to be dimensionally stable in excessively humid atmospheres or in direct contact with water. Ethyl cellulose, on the other hand, is highly water resistant, and while, when in the unmodified or in the typical plasticized state, it is not dimensionally stable in contact even with the aliphatic naphthas, which are not true solvents for ethyl cellulose, the heat-treated films of the present invention are stable in contact with naphthas and other solvents. The films of the present invention have the further advantage, not previously available in flexible bases for pressure-sensitive tapes, of responding just sufficiently to the action of the solvent for the adhesive to effect a bonding between the film and the adhesive at their interface.

It has been found that when a rubber adhesive is applied to one surface of the new films no curling or distortion occurs as happens with unmodified ethyl cellulose, and that the tape may be handled according to the regular manufacturing procedure. The resulting coated product is tough and flexible, and articles to which the tape is applied may be immersed in water without loosening or otherwise injuring the film or the adhesive. A tape such as that just described is particularly suited to electric insulation uses.

Considerable difficulty has been experienced in the past in the fabrication of laminated products at least one ply of which consists of an ethyl cellulose film. The trouble has ordinarily arisen due to the swelling and curling effects exhibited when the adhesive has been deposited from solution. Difficulties of this type have now been entirely overcome and laminated articles may readily be prepared from ethyl cellulose films even when the adhesive employed is deposited from strong solvents for cellulose ethers if the film employed is a baked film prepared from an ethyl cellulose - toluene sulphonamide - formaldehyde composition of the proportions above stated.

The use of baked films of toluene sulphonamide-formaldehyde modified ethyl cellulose now permits fabrication of containers from ethyl cellulose films in the customary box making machines whose correct functioning depends upon the dimensional stability of the film employed. The results now being obtained are in marked contrast to those heretofore noted when unmodified ethyl cellulose sheets, to portions of which a solvent-bearing adhesive had been applied, were passed through the folding mechanism of a container making machine. It was formerly found that the swelling action of the solvent upon the film caused enough distortion so that overlapping layers of film did not register properly with one another and with the guiding elements of the machine. The new modified films are sufficiently resistant to effects of solvents to overcome this difficulty completely and containers may be made from transparent films of modified ethyl cellulose in the same manner as those produced from regenerated cellulose.

Films of the herein-described modified ethyl cellulose composition are considerably superior to unmodified ethyl cellulose in the matter of their resistance to oils, greases and fats. Hence, the new films are entirely satisfactory for making transparent containers for oily or greasy substances or for wrapping packages containing such materials.

I claim:

1. An ethyl cellulose composition, capable of depositing flexible films which, when baked, are resistant to the softening and weakening effects of solvents, which consists essentially of a solution in mutual solvent of from 65 to 90 parts of medium ethoxy ethyl cellulose having an ethoxy content of from 43.5 to 46.5 percent and correspondingly from 35 to 10 parts of an organo-soluble and heat-convertible toluene sulphonamide-formaldehyde resin.

2. An ethyl cellulose composition, capable of depositing flexible films which, when baked, are resistant to the softening and weakening effects of solvents, which consists essentially of a solution in mutual solvent of from 65 to 90 parts of medium ethoxy ethyl cellulose having an ethoxy content of from 43.5 to 46.5 per cent and correspondingly from 35 to 10 parts of an organo-soluble and heat-convertible aryl sulphonamide-formaldehyde resin.

3. A baked thin article of manufacture, consisting essentially of from 65 to 90 parts of medium ethoxy ethyl cellulose having an ethoxy content of from 43.5 to 46.5 per cent and correspondingly from 35 to 10 parts of an originally organo-soluble and heat-convertible toluene sulphonamide-formaldehyde resin, and characterized by flexibility approaching that of ethyl cellulose alone and by marked resistance to the softening and weakening effects of solvents.

4. A baked thin article of manufacture, consisting essentially of from 65 to 90 parts of medium ethoxy ethyl cellulose having an ethoxy content of from 43.5 to 46.5 per cent and correspondingly from 35 to 10 parts of an originally organo-soluble and heat-convertible aryl sulphonamide-formaldehyde resin, and characterized by flexibility approaching that of ethyl cellulose alone and by marked resistance to the softening and weakening effects of solvents.

5. A dimensionally stable baked film, consisting essentially of from 65 to 90 parts of medium ethoxy ethyl cellulose having an ethoxy content of from 43.5 to 46.5 per cent and correspondingly from 35 to 10 parts of an originally organo-soluble and heat convertible toluene sulphonamide-formaldehyde resin, and characterized by flexibility approaching that of ethyl cellulose alone and by marked resistance to the softening and weakening effects of solvents.

TOIVO A. KAUPPI.